United States Patent
Huebner et al.

(10) Patent No.: US 12,539,517 B2
(45) Date of Patent: Feb. 3, 2026

(54) APPARATUS AND METHOD FOR PRODUCING HULLED SPELT SEEDS

(71) Applicant: Lehner Maschinenbau GmbH, Westerstetten (DE)

(72) Inventors: Ralf Huebner, Westerstetten (DE); Helmut Lehner, Westerstetten (DE)

(73) Assignee: Lehner Maschinenbau GmbH, Westerstetten (DE)

( * ) Notice: Subject to any disclaimer, the term of this patent is extended or adjusted under 35 U.S.C. 154(b) by 369 days.

(21) Appl. No.: 18/020,766

(22) PCT Filed: Aug. 13, 2021

(86) PCT No.: PCT/EP2021/072600
§ 371 (c)(1),
(2) Date: Feb. 10, 2023

(87) PCT Pub. No.: WO2022/034216
PCT Pub. Date: Feb. 17, 2022

(65) Prior Publication Data
US 2023/0302458 A1    Sep. 28, 2023

(30) Foreign Application Priority Data

Aug. 13, 2020  (EP) .................................. 20190921
Aug. 13, 2020  (EP) .................................. 20190924

(51) Int. Cl.
*B02B 3/02*        (2006.01)
(52) U.S. Cl.
CPC ..................... *B02B 3/02* (2013.01)

(58) Field of Classification Search
CPC ........................................................ B02B 3/02
(Continued)

(56) References Cited

U.S. PATENT DOCUMENTS 2,791,254 A    5/1957  Crane
3,703,200 A    11/1972 Palyi et al.
(Continued)

FOREIGN PATENT DOCUMENTS

AT    357 009 B    6/1980
CH    410595 A     3/1966
(Continued)

OTHER PUBLICATIONS

International Search Report in PCT/EP2021/072600, mailed Dec. 8, 2021.
(Continued)

*Primary Examiner* — Brent T O'Hern
(74) *Attorney, Agent, or Firm* — Collard & Roe, P.C.

(57) ABSTRACT

In a hulling apparatus for producing hulled spelt seed including a lower course hulling device, and a method for producing hulled seed of a spelt grain, the hulling apparatus contains two disks, as rotor and stator, which are movable relative to each other, wherein at least one disk can be driven about a vertical rotation axis, and the disks enclose a flat annular working chamber between disk faces which face each other and are vertically spaced apart from each other, for receiving spelt products to be hulled, wherein at least one of the disk faces has a surface made of a plastic material, and the temperature of the apparatus can be controlled in the region of at least one of the disk faces.

10 Claims, 5 Drawing Sheets

(58) Field of Classification Search
USPC .......................................... 426/483; 246/483
See application file for complete search history.

(56) References Cited

U.S. PATENT DOCUMENTS

| | | | |
|---|---|---|---|
| 4,090,669 A | 5/1978 | Lermuzeaux | |
| 4,196,224 A | 4/1980 | Falk | |
| 2023/0149936 A1 * | 5/2023 | Huebner | ................ B02C 7/186 |
| | | | 426/618 |

FOREIGN PATENT DOCUMENTS

| | | | | |
|---|---|---|---|---|
| CN | 107262188 A | | 10/2017 | |
| CN | 107694658 A | * | 2/2018 | ............... B02B 3/02 |
| DE | 1938328 B2 | | 12/1973 | |
| DE | 38 03 858 A1 | | 8/1989 | |
| DE | 10 2016 115 621 A1 | | 3/2018 | |
| GB | 2323766 A | | 10/1998 | |

OTHER PUBLICATIONS

S. Gräber, et al., "Entspelzungsversuche an Dinkel mittels Druckluft-Prallentspelzers", Die Bodenkultur, Issue 49 (3) 1998, pp. 171-178 (with English Summary) (See specification, paragraph [0003], for relevance).

* cited by examiner

APPARATUS AND METHOD FOR PRODUCING HULLED SPELT SEEDS

CROSS REFERENCE TO RELATED APPLICATIONS

This application is the National Stage of PCT/EP2021/072600 filed on Aug. 13, 2021, which claims priority under 35 U.S.C. § 119 of European Application No. 20190921.5 filed on Aug. 13, 2020 and European Application No. 20190924.9 filed on Aug. 13, 2020, the disclosures of which are incorporated by reference. The international application under PCT article 21(2) was not published in English.

BACKGROUND OF THE INVENTION

1. Field of the Invention

The invention relates to an apparatus and to a method for producing hulled spelt seeds.

2. Description of the Related Art

With certain types of cereal, it is necessary before processing to remove the hull that does not fall out during the course of a threshing process. For this purpose, so-called hulling mills are known from the general prior art. They are used, for example, in the case of spelt, emmer wheat, or rice. In particular for spelt, this is referred to as hulling.

In addition to the hulling mills already known, it has also been proposed to carry out hulling by means of compressed air. For example, in a technical article by S. Graber, et al., "Entspelzungsversuche an Dinkel mittels Druckluft-Prallentspelzers", Die Bodenkultur, Issue 49 (3) 1998, page 171, it has been described that it is possible to achieve good hulling results with a compressed air impact huller. The parameters with which the huller is operated are adapted as much as possible to the sample in this case. In order to break up the hulls, a working pressure is adjusted to correspond to the product moisture. However, to prevent fracturing of the grains, it must not be too high.

Other devices known from the prior art include so-called lower course hulling devices in which the hulling takes place between stone disks. However, such devices can frequently lead to damage to the surface of the grain, such that the germination ability of the grain cannot be ensured with such devices from the prior art.

DE 38 03 858 A1 discloses a spelt hulling machine in which a rotatable friction disk and a non-rotatable friction disk are arranged in a housing in such a manner that the axes of the friction disks are horizontal. As such, the dead weight of the disks does not affect the gap distance between the disks. The friction disks are provided with friction grooves which run in a star shape from the inside to the outside and have a V-shaped or frustoconical cross section. The friction disks can be manufactured completely or partially from a rubber or a plastic material.

AT 357 009 B discloses a device for removing fruit skin and fruit flesh as well as for partially drying washed cereals and pulses.

U.S. Pat. No. 2,791,254 A discloses a seed sheller which comprises two partially elastic disks. For this purpose, the rotating and non-rotating shelling disks can be constructed such that the side facing the fruit consists of a plastic or rubber.

DE 10 2016 115 621 A1 discloses a method and an apparatus for producing hulled spelt seed with a lower course hulling apparatus which contains two disks movable relative to one another, wherein at least one disk can be driven about a vertical rotation axis, and the disks enclose a flat, annular working chamber between disk faces which face each other and are vertically spaced apart from each other, for receiving spelt seeds, wherein at least one of the disk faces has a surface made of a plastic material.

As a result of the increasing use of spelt as a grain, there is therefore a need in the art to create a spelt huller which makes it possible, in a simple manner, to efficiently hull spelt for the purpose of seed production. Furthermore, it is an object of the invention to specify a method which provides a simple and reliable hulling for the purpose of seed production.

SUMMARY OF THE INVENTION

This object is achieved by a hulling apparatus as disclosed herein. Further advantageous embodiments of the invention are each the subject matter of the dependent claims. These can be combined with one another in any feasible manner. The description, in particular in conjunction with the drawing, additionally characterizes and specifies the invention.

According to an embodiment of the invention, an apparatus is provided for producing hulled spelt seed, comprising a lower course hulling device containing two disks, a rotor and stator, which are movable relative to one another, wherein at least one disk can be driven about a vertical rotation axis, and the disks enclose a flat, annular working chamber between disk faces which face each other and are vertically spaced apart from each other, for receiving spelt products to be hulled, wherein at least one of the disk faces has a surface made of a plastic material, characterized in that the temperature of the apparatus can be controlled in the region of at least one of the disk faces.

Accordingly, in the apparatus according to the invention, the temperature of the spelt products to be hulled is controlled at the same time, such that the spelt products to be hulled remains during the hulling process in a prespecified temperature range during the production of spelt seeds, which has a positive effect on the germinative power of the seed produced in this way. The temperature range can be determined experimentally. Surprisingly, it has been shown that the controlled application of heat enables a germination ability of the spelt seed thus produced, which can be between 95% and 98%. Bringing the hulling material into a prespecified temperature range for the purpose of temperature stabilization can take place in different ways. It is only important that the application of heat takes place immediately before or during the hulling process, wherein, due to the friction heat produced, an additional thermal load may be exerted on the hulling material, such that the temperature must also be controlled by cooling in order to remain within the prespecified temperature range.

According to one embodiment of the invention, the temperature control is carried out by means of a temperature-controlled air flow which is supplied via one or more hose lines.

Since heat can be both supplied and discharged via an air flow, this procedure constitutes a simple option for temperature control in order to bring the spelt products to be hulled into the prespecified temperature range.

According to a further embodiment of the invention, the temperature-controlled air flow enters in the region of the inlet opening of the apparatus together with the spelt products to be hulled.

This enables a compact construction of the apparatus, wherein the temperature-controlled air flow can be used to ensure that the spelt products to be hulled contacts the two disks in the prespecified temperature range.

According to a further embodiment of the invention, the temperature control is carried out by means of a temperature-controlled fluid flow.

A fluid flow is advantageous in particular for transmitting greater amounts of heat.

According to a further embodiment of the invention, the fluid flow is at least routed in sections in the interior of a stator in the form of fluid channels. In this case, it is also provided that the fluid flow is at least routed in sections in the interior of a preferably metallic body attached to the stator in the form of fluid channels.

In this way, a heat supply or heat discharge can be carried out in a targeted manner at specific positions in the interior of the apparatus. The body can be produced from a thermally-conductive metal, for example aluminum or copper.

According to a further embodiment of the invention, the fluid flow is formed by means of water or oil, in particular a food-safe vegetable oil.

According to a further embodiment of the invention, a control circuit is provided which is connected to a sensor circuit for the purpose of measuring the temperature. In this case, the control circuit can control one or more fluid supply devices in order to achieve stable temperature control by heat supply or heat discharge in the region of the two disks or in front of the two disks.

In this way, the existing temperature-controlled supply of fluid is complemented by a control loop, wherein one or more temperature measurements can be used as the controlled variable by means of a sensor circuit. The temperature measurement can be carried out at different positions. In particular, the rigid components of a hulling mechanism can be contemplated for this purpose.

According to a further embodiment of the invention, the obtained spelt seed has a germination ability of 95% or greater.

According to the invention, a method is also specified for producing hulled seeds from spelt grain, in which the steps presented below are carried out. A hulling apparatus is provided. Hulling material is supplied to the hulling apparatus. The hulling material is exposed to heat in the hulling apparatus, such that, during the hulling process, the hulling material is brought to a prespecified temperature range.

Accordingly, in the method according to the invention, the hulling apparatus is additionally operated in such a way that heat is applied to the hulling material, such that the hulling material remains within a prespecified temperature range during the hulling process, which has a positive effect on the germinating power of the seed produced in this way. In this case, the temperature range can be determined experimentally; accordingly, depending on the spelt grain used, different temperature ranges may also result. Particular preference is given to the use of spelt as the spelt grain. In this case, it has been shown that the controlled application of heat enables a germination ability of the spelt seed produced in this manner which can be between 95% and 98%. Bringing the hulling material into a prespecified temperature range for the purpose of temperature stabilization can take place in different ways depending on the hulling apparatus used. It is only important that the application of heat takes place immediately before or during the hulling process, wherein, in some hulling apparatuses, which can exert an additional thermal load on the hulling material due to the frictional heat produced, a cooling may also occur in order to remain within the prespecified temperature range.

According to a further embodiment of the invention, the spelt grain is spelt.

As already mentioned, it is advantageous to provide a temperature range in particular in the production of spelt seed from hulled spelt grain. Other spelt grains, such as emmer wheat or the like, are not excluded.

According to a further embodiment of the invention, the application of heat is achieved by supplying fluid to the hulling apparatus.

Since, in general, heat can be both supplied and also discharged with the supply of a fluid, this approach constitutes a simple possibility for applying heat to bring the hulling material into the prespecified temperature range.

According to a further embodiment of the invention, the fluid is supplied by means of a temperature-controlled air flow, which preferably enters in the region of the inlet opening of the hulling apparatus together with the supplied hulling material.

This enables a compact construction of the hulling apparatus, wherein the temperature-controlled air flow can be used to ensure that the hulling material remains in the prespecified temperature range in the interior of the hulling apparatus.

According to a further embodiment of the invention, the fluid is supplied by means of a temperature-controlled fluid flow.

A fluid flow is advantageous in particular for transmitting greater amounts of heat. In this case, the fluid flow can be at least routed in sections in the interior of the hulling apparatus in the form of fluid channels. In this way, a heat supply or heat discharge can be carried out in a targeted manner at specific positions in the interior of the hulling apparatus. The fluid flow is advantageously formed by means of water or oil, wherein, for example, a food-safe vegetable oil can be used for the preheating.

According to a further embodiment of the invention, the fluid supply is controlled by means of a sensor circuit used for temperature measurement.

In this way, the existing temperature-controlled supply of fluid is complemented by a control loop, wherein one or more temperature measurements of a sensor circuit can be used as the controlled variable. The temperature measurement can be carried out at different positions depending on the hulling apparatus used. In particular, the rigid components of a hulling mechanism can be contemplated for this purpose.

According to a further embodiment of the invention, the hulling apparatus is provided as a lower course huller, as a roller huller, or as an upper course huller.

As already mentioned, the invention can be applied to different hulling apparatuses, wherein the mentioned embodiments have proven to be useful in the prior art as hulling devices for spelt grains, and have rotating components which generate heat by friction during operation.

According to a further embodiment of the invention, further hulling material is fed to the hulling apparatus in a pre-feed for the application of heat.

Accordingly, prior to the actual hulling process, a pre-feed for temperature stabilization is first carried out by feeding further hulling material. In this case, the further hulling material can also be a hulling material that is different in comparison to the actual spelt grain. For example, chips or beads of natural materials could be used, which bring the hulling apparatus into the prespecified temperature range during the pre-feed operation. Of course, the use of the actual hulling material for the purpose of temperature stabilization in the pre-feed is not ruled out.

BRIEF DESCRIPTION OF THE SEVERAL VIEWS OF THE DRAWINGS

Exemplary embodiments are explained in more detail below with reference to the drawings, wherein.

DETAILED DESCRIPTION OF THE PREFERRED EMBODIMENTS

Figure 1:
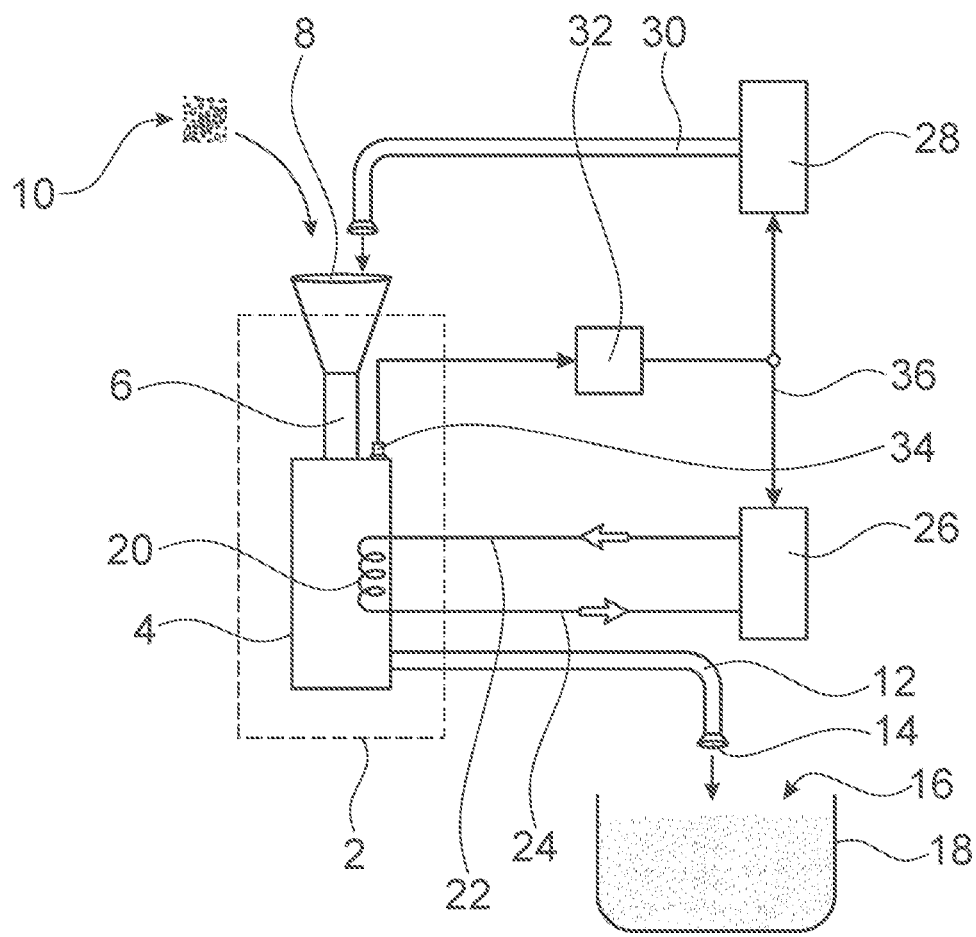
FIG. 1 is a schematic view of a hulling apparatus for carrying out the method according to the invention.

In the figures, identical or identically acting components are provided with the same reference numerals.

A first embodiment of the invention will be described below with reference to FIG. 1. FIG. 1 is a schematic view of a hulling apparatus 2 which has a hulling mechanism 4 in its interior, which can be supplied via a filler neck 6 having an inlet opening 8 with hulling material 10 made of an as yet unhulled spelt grain. The hulled material exits the hulling apparatus 2 via the outlet funnel 12 and the outlet opening 14, for example in the form of hulled spelt seed. The hulled seed, which is indicated by the reference sign 16 in FIG. 1, can be conveyed, for example, to a collecting container 18 or to bags or the like for further use.

The hulling mechanism 4 can be designed in different ways. In addition to an embodiment in the form of a lower course hulling device, it is also conceivable to form the hulling mechanism 4 as a roller hulling device or as an upper course device, which likewise have components rotating opposite one another.

In its interior, the hulling mechanism 4 has a fluid channel 20, which is coupled via connecting lines 22 and 24 to a first fluid supply device 26. Alternatively or additionally, a second fluid supply device 28 can be provided, which forms a fluid channel to the inlet opening 8 of the hulling apparatus 2 via a feed tube 30.

The first fluid supply device 26 in this case is typically operated with a fluid flow, which is at least temperature-controlled and which flows through the hulling mechanism 4 between the first fluid supply device 26, the connecting line 22, the fluid channel 20, and the further connecting line 24. In this way, the hulling mechanism 4 can, for example, be brought to a prespecified temperature by supplying heat—by supplying temperature-controlled oil, in particular by means of a food-safe vegetable oil, or water. In particular in the case of lower course hulling devices, however, the first fluid supply device 26 can also be used for cooling, since in the case of such hulling devices a high amount of frictional heat arises between the hulling disks.

The second fluid supply device 28 can supply a temperature-controlled air flow to the hulling apparatus 2 via the inlet opening 8. In this way, the hulling material 10 can be subjected to heat even before being fed to the hulling mechanism 4. In this case too, it is possible for the temperature-controlled air flow to also work to cool the hulling mechanism 4.

In addition to a temperature-controlled embodiment, it is also possible to use a control circuit 32 which is connected to a sensor 34 which can carry out a temperature measurement. In the exemplary embodiment shown, the sensor 34 is arranged on the hulling mechanism 4. Of course, it is also possible to arrange the sensor 34 at other positions or to provide further sensors in order to provide additional information to the control circuit 32. The control circuit 32 is connected via the connection 36 to the first fluid supply device 26 and the second fluid supply device 28.

In addition to the control of the fluid supply shown, however, it is also possible, for example in the case of lower course hulling devices, to achieve a temperature stabilization by a pre-feed of hulling material. For this purpose, hulling material 10 would be supplied until the desired temperature or the desired temperature range in the hulling apparatus 2 is reached. The hulling material initially supplied to the pre-feed can differ from the actual hulling material from which seed will be obtained later. In this case, it is provided as specially shaped bodies made of natural materials.

Figure 2:
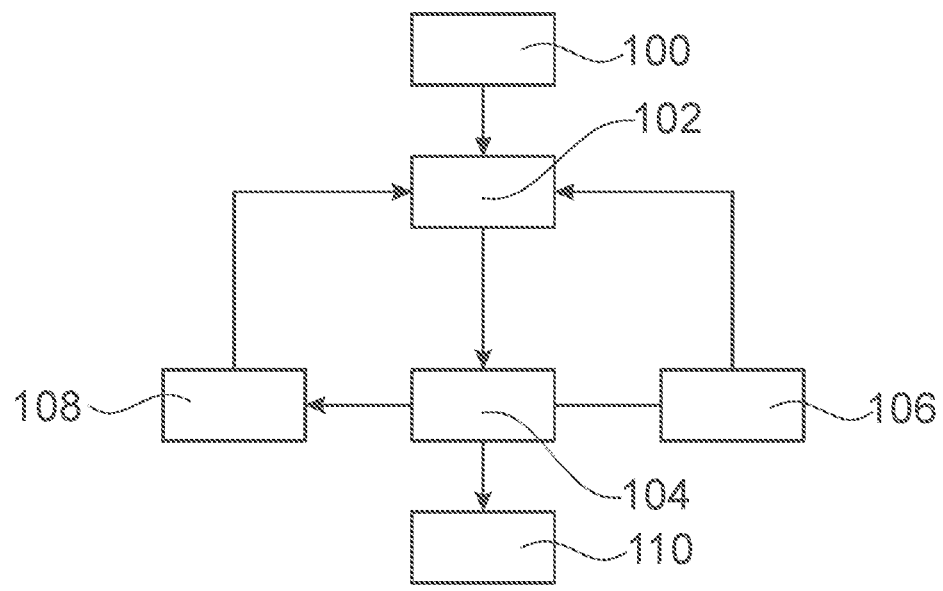
FIG. 2 shows the method according to the invention in a flow chart.

The method according to the invention will be presented below in a flowchart with reference to FIG. 2. Proceeding from a start point 100, a fluid supply is initially activated in step 102. Subsequently, a temperature measurement takes place in step 104, wherein, depending on the value obtained, the fluid supply is adjusted for a temperature increase in step 106 or for a temperature decrease in step 108. The method ends in step 110. From there, a return to step 100 can again take place.

According to the invention, the aim is a temperature range between 50° C. and 130° C. At this temperature, the hardness of the plastic surfaces of the hulling disks 40 and 42 in the hulling apparatus 2 changes, such that they become softer during operation. That is to say, they have a lower Shore hardness but do not lose stability. This desired change in the structure of the surfaces of the hulling disks 40 and 42, which are typically made of rubber-like materials, of silicone materials, or of polyurethane, has a positive effect on the hulling performance and the service life of the hulling disks 40 and 42 used.

Figure 3:
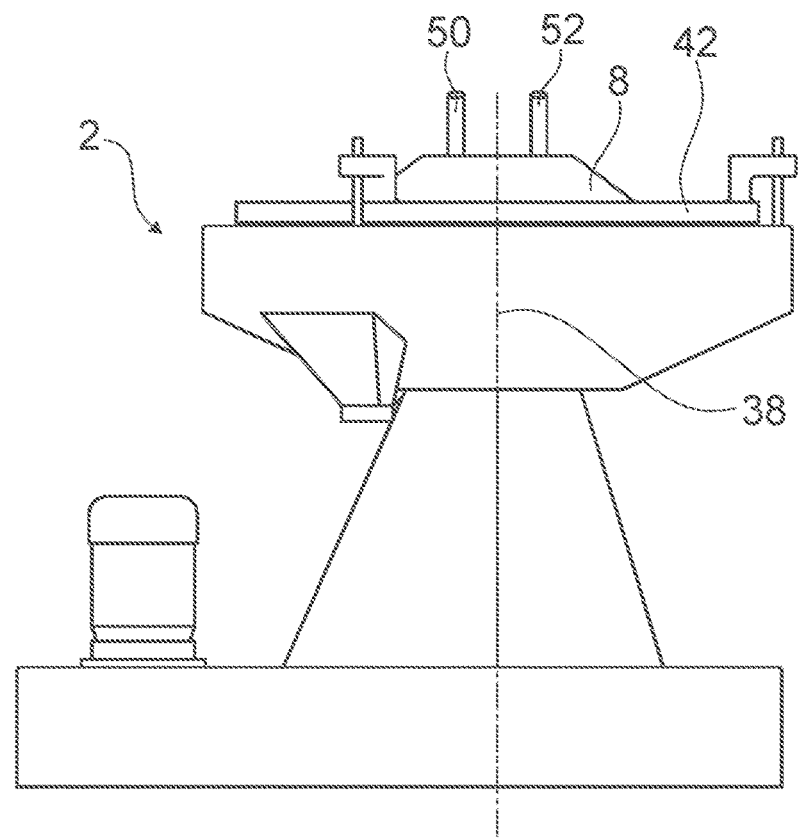
FIG. 3 is a side view of an embodiment of an apparatus according to the invention for producing hulled spelt seeds.

FIG. 3 shows a side view of a further hulling apparatus 2 for producing hulled spelt seeds. This is a lower course hulling device known per se from the prior art. The components which are relevant for the hulling of spelt seeds are concealed in the interior of the apparatus. To explain the components relevant to the invention, reference is made below to FIG. 4, which shows a sectional view of the hulling apparatus 2 along the axis 38 perpendicular to the plane of the page. The hulling apparatus 2 has on its upper side the inlet opening 8, which serves to supply seed grains which have hulls or are partially hulled.

Figure 4:
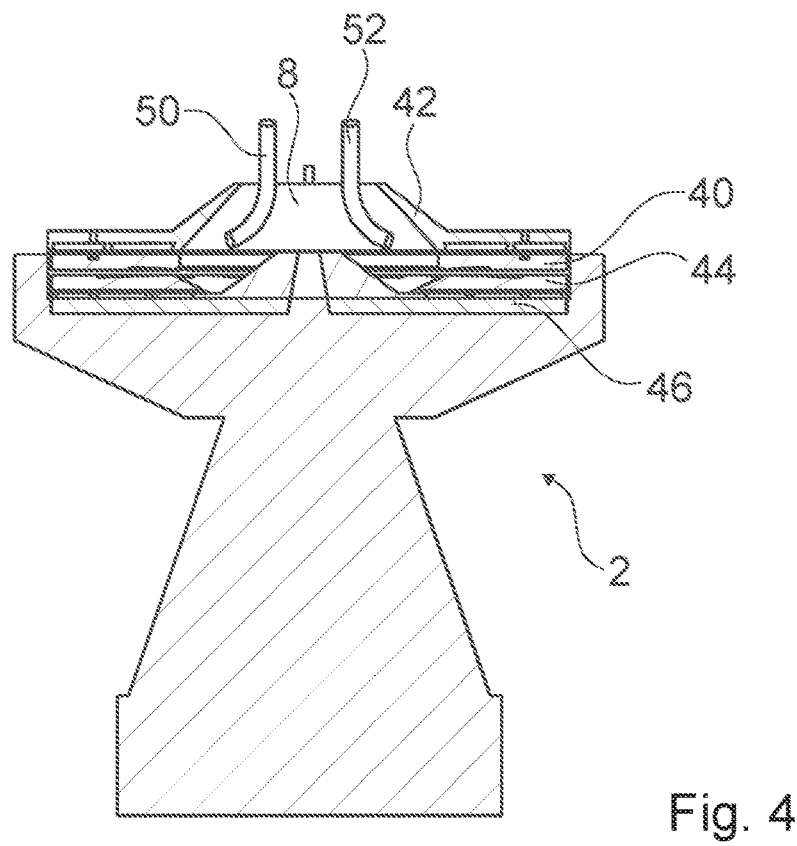
FIG. 4 is a sectional view of the apparatus of FIG. 3.

FIG. 4 shows that the hulling apparatus 2 for producing hulled spelt seeds is constructed from a first disk 40, which is a component of a stator 42, and a second disk 44, which is a component of a rotor 46. Spelt grains pass through the filling opening 8 into the region between the two disk faces 40 and 44, and are conveyed, due to centrifugal force produced by the rotation of the rotor 46, through the working region between the two disk faces 40 and 44 and to the outer edge of the two disk faces 40 and 44. The completely or partially hulled spelt grain is conveyed for the hulling, during the production of seed, between the stator and the movably designed rotor on the two disk faces 40 and 44, such that a hulling occurs at least in part. Accordingly, a flat annular working chamber 48 is formed between the first disk 40 and the second disk 44, which space can receive the spelt seed.

It can be seen from FIG. 3 and FIG. 4 that a first hose line 50 and a second hose line 52 are provided for the hulling apparatus 2 in the region of the inlet opening 8. The first hose line 50 and the second hose line 52 can supply a temperature-controlled air flow to the hulling apparatus 2 via the inlet opening 8. In this way, the region between the first disk 40 and the second disk 44 can be temperature-controlled accordingly, such that the supplied spelt grain is kept within a defined temperature range.

For this purpose, not only the region of the two disks 40 and 44 can be temperature-controlled via the first hose line 50 and the second hose line 52, but it is also possible in other embodiments to apply hot or cold air directly to the spelt grain. Since a high frictional heat is produced between the two disks 40 and 44 due to the spelt grain being conveyed radially outwards, it is also conceivable that the air flow changes after an initial preheating with hot air to a cooling with cold air. A suitable control circuit is described further below.

Figure 5:
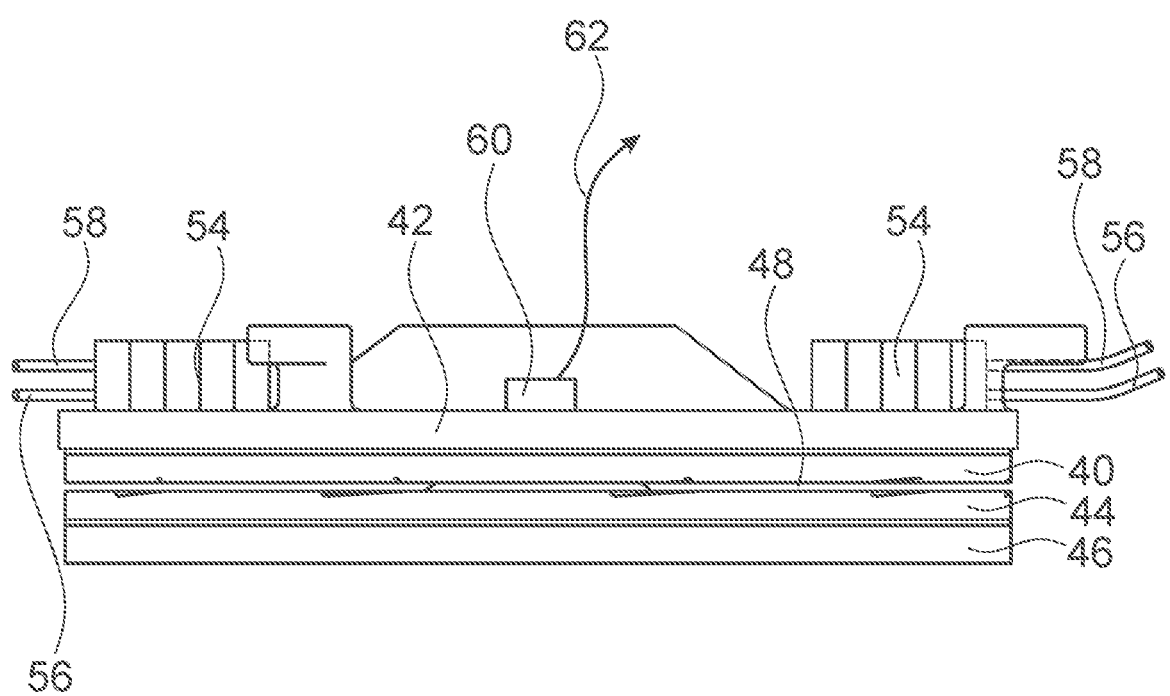
FIG. 5 is a part of the apparatus according to the invention from FIG. 3 in a side view, according to a first embodiment.

A further embodiment of the invention is shown with reference to FIG. 5. In this case, one or more metallic bodies 54, which have fluid channels (not shown) connected by means of a fluid supply 56 and a fluid discharge 58 to a fluid supply device (not shown), are attached to the stator 42. In this way, cooling can be carried out in particular in the region of the stator, for the purpose of controlling the temperature of the first hulling disk 40. A sensor 60, which can transmit the temperature value to a corresponding controller, for example by a wired means, by means of the wire connection 62, can also be arranged at this position. An additional control with respect to the replenishment of the spelt grains at the filling opening 8 can be based on the current consumption of an electric drive of the rotor, which is lower in the case of decreasing seed in the working chamber 48, and can be increased again up to a desired value by automatic replenishment.

Figure 6A:
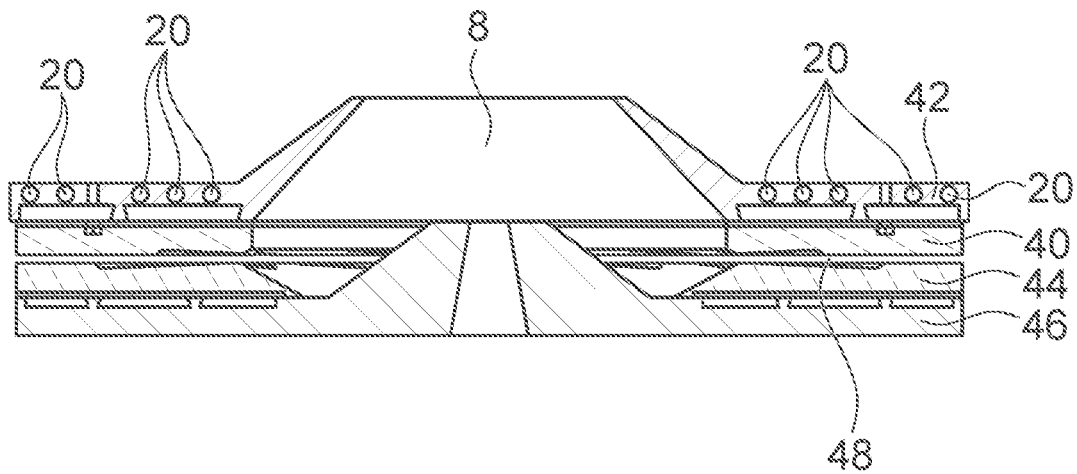
FIG. 6A is a part of the apparatus according to the invention from FIG. 3 in a sectional view, according to a second embodiment.

FIG. 6A shows a further embodiment of the invention. In this embodiment, instead of the metallic bodies 54, several fluid channels 20 are formed directly in the stator 42, which are then connected to the fluid supply 56 and the fluid discharge 58.

Figure 6B:
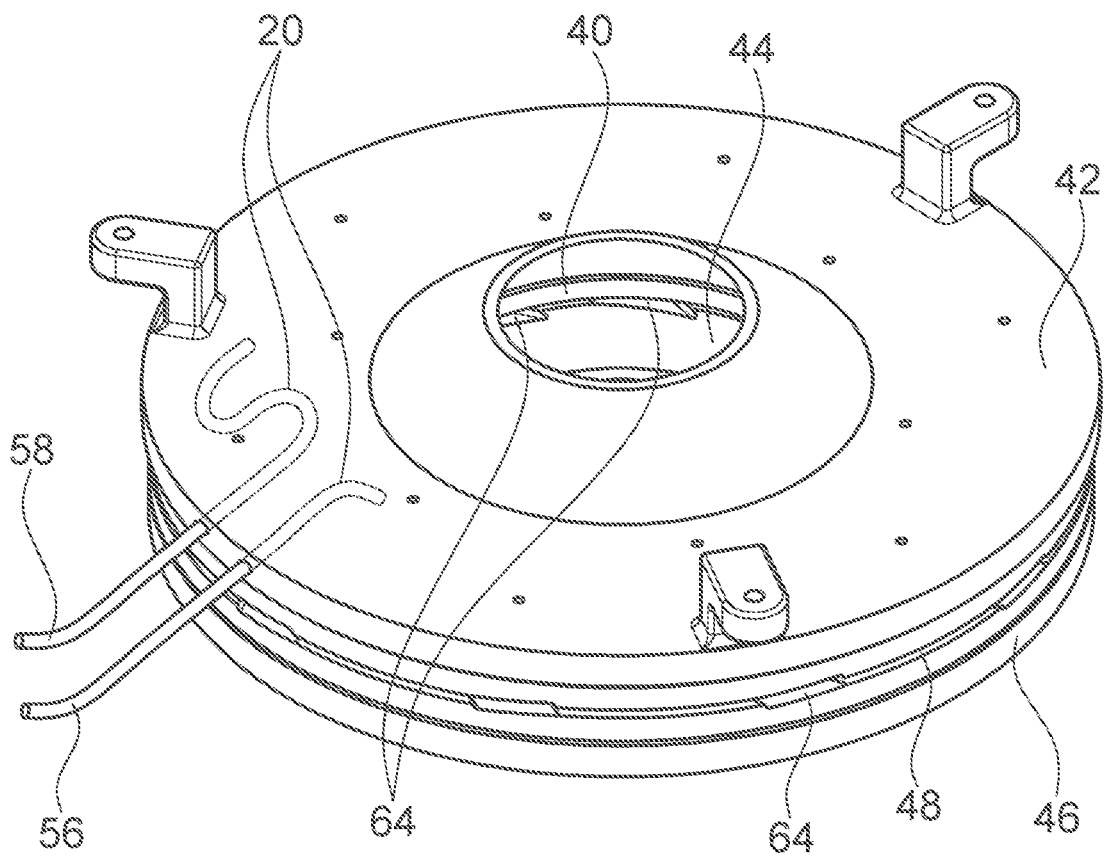
FIG. 6B is the part of the apparatus from FIG. 6A in a perspective side view.

The connection to a fluid supply device is described again in more detail in conjunction with FIG. 6B. It can be seen that the fluid channels 20 are connected on their outer periphery to the fluid supply 56 and the fluid discharge 58.

The embodiments according to FIG. 5, FIG. 6A, and FIG. 6B use, for example, water or oil, in particular a food-safe vegetable oil, such as rapeseed oil, as a working medium.

It can be seen from FIG. 6B that the working chamber 48 for receiving spelt seed material is located between the disks 40 and 44, wherein according to the invention it is provided that at least one of the two disks 40 and 44, and preferably both disks 40 and 44, are made of a plastic material or are provided with a layer of plastic material, wherein the layers of plastic material are applied to surfaces facing one another. Furthermore, it can be seen in particular in FIG. 6B that the disks 40 and 44 are each formed with radially outwardly running grooves 64 which are recessed with respect to the surface of the disks 40 and 44. Grooves of this kind enable the transport of hulled or partially hulled spelt seed radially outwards.

In addition to the shown temperature-controlled fluid supply by means of air or fluid, it is therefore also possible to achieve a temperature stabilization in the hulling apparatus 2 by a pre-feed of hulling material. For this purpose, hulling material would be supplied until the desired temperature or the desired temperature range in the hulling apparatus 2 would be achieved. The frictional heat generated during passage through the working chamber 48 for receiving spelt seed between the two disks 40 and 44 is therefore used for an initial temperature stabilization of the hulling apparatus 2. After a longer period of operation, a cooling can then be provided again via the hose lines 50 and/or 52. Alternatively or additionally, fluid cooling can also take place via the fluid supply 56 and fluid discharge 58. The hulling material initially supplied to the pre-feed can differ from the actual hulling material from which seed will be obtained later. In this case, it is provided as specially shaped bodies made of natural materials.

Figure 7:
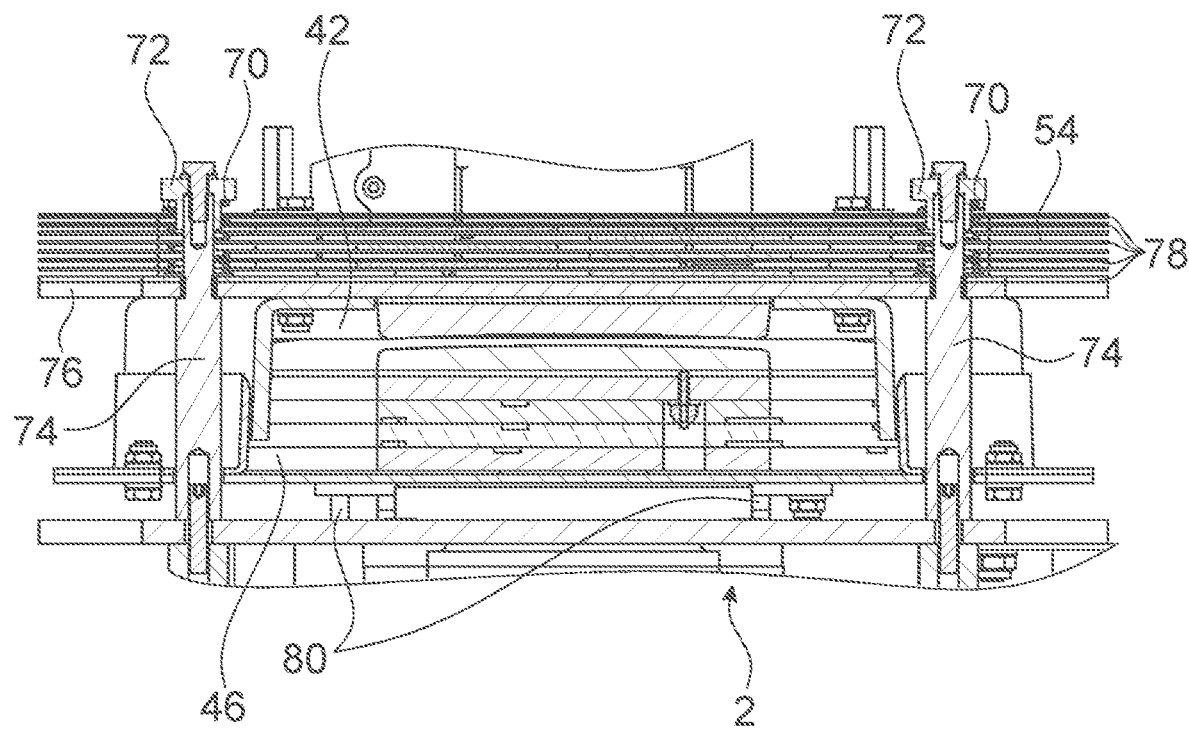
FIG. 7 is a part of the apparatus according to the invention from FIG. 3 in a sectional view, according to a third embodiment.

With reference to FIG. 7, a further sectional view of the hulling apparatus 2 is shown in a further embodiment. In addition to the features already explained above, the stator 42 together with the first disk 40 can be displaced relative to the rotor 46, and is acted upon with a contact pressure directed toward the rotor 46. The contact pressure is generated by a plurality of springs 70 which lies between spring disks 72 at an upper end of a bolt 74 and the upper side 76 of the stator 42 provided with the metallic body 54, such that the stator 42 can be moved away from the rotor 46. In this way, in the case of larger diameters of the hulling material, which would have to be set by the user via the gap in the working chamber 48, it is possible to compensate within certain limits without the hulling apparatus 2 being clogged or the seed being damaged. The metallic body 54 shown in FIG. 7 is similar to a heat sink which has a plurality of cooling ribs 78. The vanes 80 arranged on the underside of the rotor 46 generate cooling air and can be adapted in terms of their total number to the cooling requirements.

Figure 8:
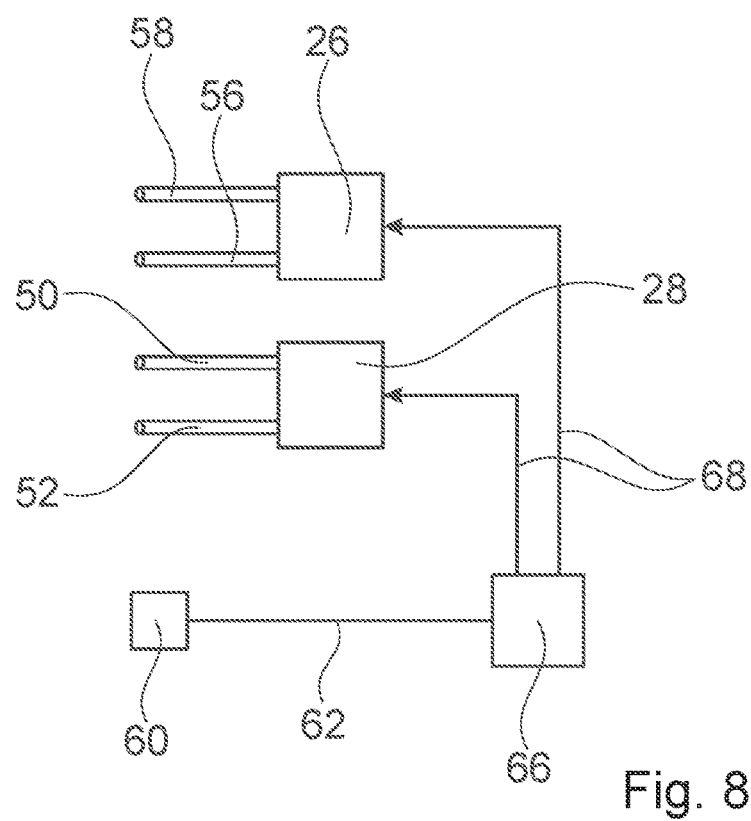
FIG. 8 is a schematic illustration of an apparatus according to the invention, according to a third embodiment.

Hereinafter, with reference to FIG. 8, an enhancement of a temperature controlled embodiment to an embodiment with a temperature control loop will be described. To this end, a further control circuit 66 is used which is connected to the above-mentioned sensor 60 via the wire connection 62, which sensor can perform a temperature measurement. In the exemplary embodiment shown, the sensor 60 is arranged on the stator 42. Of course, it is also possible to arrange the sensor 60 at other positions or to provide further sensors in order to provide additional information to the further control circuit 66. The further control circuit 66 is connected via the further connecting lines 68 to a first fluid supply device 26 and a second fluid supply device 28. In other embodiments, only one of the fluid supply devices 26 or 28 may be present. It is also possible to use several first fluid supply devices 26 or several second fluid supply devices 28.

The first fluid supply device 26 is connected to the fluid supply 56 and the fluid discharge 58 according to the embodiments according to FIG. 5, FIG. 6A or FIG. 6B, in order to supply or discharge heat. The second fluid supply device 28 is connected to the first hose line 50 and the second hose line 52, in order to apply hot or cold air to the hulling apparatus 2. Both fluid supply devices 26 or 28 are operated within a control loop via the control circuit 66.

By means of an apparatus described above or by means of an above-described method, by hulling spelt grains which have hulls, the spelt seeds have a germination ability of greater than 90%, in particular greater than 95%. The germination ability, sometimes also referred to as a green yield, of spelt seed can be determined by means of a cold test within the scope of a prespecified method. The germination ability values of the hulled spelt seed obtained in particular with the apparatus according to the invention or the method according to the invention exceed the minimum requirement in agriculture.

The features described above and the features described in the claims, and those which can be gathered from the figures, can be advantageously realized both individually and in different combinations. The invention is not limited to the described exemplary embodiments, but can be modified in many ways using the knowledge of a person skilled in the art.

The invention claimed is:

1. A hulling apparatus for producing hulled spelt seed, comprising a lower course hulling device, containing two disks, as rotor and stator, which are movable relative to one another,
    wherein at least one disk can be driven about a vertical rotation axis, and the disks enclose a flat annular working chamber between disk faces which face each other and are vertically spaced apart from each other, for receiving spelt products to be hulled,
    wherein at least one of the disk faces has a surface made of a plastic material,
    wherein a temperature of the apparatus is controlled in a region of at least one of the disk faces to control a temperature of the spelt products to be hulled, such that the spelt products to be hulled remain at a predetermined temperature range during a hulling process for production of hulled spelt seed.

2. The apparatus according to claim 1, wherein a temperature control is carried out by means of a temperature-controlled air flow which is supplied via one or more hose lines.

3. The apparatus according to claim 2, wherein the temperature-controlled air flow enters in a region of an inlet opening of the apparatus together with the spelt products to be hulled.

4. The apparatus according to claim 1, wherein a temperature control is carried out by means of a temperature-controlled fluid flow.

5. The apparatus according to claim 4, wherein the fluid flow is at least routed in sections in an interior of the stator in a form of fluid channels.

6. The apparatus according to claim 4, wherein the fluid flow is at least routed in sections in an interior of a metallic body attached to the stator in a form of fluid channels.

7. The apparatus according to claim 4, wherein the fluid flow is formed by water or oil.

8. The apparatus according to claim 1, wherein a control circuit is provided which is connected to a sensor circuit for temperature measurement.

9. The apparatus according to claim 8, wherein the control circuit controls one or more fluid supply devices to achieve a stable temperature control by means of heat supply or heat discharge in the region of the two disks or in front of the two disks.

10. The apparatus according to claim 1, wherein the stator is mounted via a plurality of springs which produce a contact pressure in the direction of the rotor.

* * * * *